United States Patent [19]
Boutaghou et al.

[11] Patent Number: 5,943,189
[45] Date of Patent: Aug. 24, 1999

[54] PIEZOELECTRIC ENGAGEABLE SLIDER AND SLIDER MICROACTUATOR

[75] Inventors: Zine-Eddine Boutaghou, Vadnais Heights; Peter R. Goglia, Edina, both of Minn.

[73] Assignee: Seagate Technology, Inc., Scotts Valley, Calif.

[21] Appl. No.: 09/006,654

[22] Filed: Jan. 14, 1998

Related U.S. Application Data

[63] Continuation-in-part of application No. 08/846,809, Apr. 30, 1997, abandoned
[60] Provisional application No. 60/031,579, Dec. 5, 1996, abandoned, provisional application No. 60/046,313, May 13, 1997, abandoned, and provisional application No. 60/046,317, May 13, 1997.

[51] Int. Cl.$^6$ ................................. G11B 5/60; G11B 5/58
[52] U.S. Cl. .............................................. 360/103
[58] Field of Search ................................... 360/103, 104, 360/109

[56] References Cited

U.S. PATENT DOCUMENTS

| | | | |
|---|---|---|---|
| 4,605,977 | 8/1986 | Matthews | 360/103 |
| 4,651,242 | 3/1987 | Hirano et al. | 360/103 |
| 4,853,810 | 8/1989 | Pohl et al. | 360/103 |
| 5,021,906 | 6/1991 | Chang et al. | 360/103 |
| 5,105,408 | 4/1992 | Lee et al. | 369/44.15 |
| 5,189,578 | 2/1993 | Mori et al. | 360/106 |

(List continued on next page.)

FOREIGN PATENT DOCUMENTS

| | | |
|---|---|---|
| 4-265584 | 9/1992 | Japan . |
| 5-250643 | 9/1993 | Japan . |
| 6-176336 | 6/1994 | Japan . |
| 7-073619 | 3/1995 | Japan . |
| 7-085621 | 3/1995 | Japan . |
| 7-326149 | 12/1995 | Japan . |
| 8-087730 | 4/1996 | Japan . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS– Based HDD Slider" by Imamura et al, *IEEE* 1996.

"An Experiment for Head Positioning System Using Sub–micron Track–width GMR Head" by Yoshikawa et al., *IEEE Transactions on Magnetics*, vol. 32, No. 5, Sep. 1996.

(List continued on next page.)

*Primary Examiner*—Jefferson Evans
*Attorney, Agent, or Firm*—Kinney & Lange

[57] ABSTRACT

A slider assembly for selectively altering a position of a transducing head with respect to a rotatable disc includes a slider body having opposing leading and trailing edge surfaces, opposing top and bottom surfaces, and opposing first and second side surfaces. The slider body is arranged to be supported by a support structure over a surface of the rotatable disc. A slot is formed in the slider body proximate the trailing edge surface, forming a hinge joining a distal portion of the slider body adjacent the trailing edge surface to a main portion of the slider body. The transducing head is carried by the distal portion of the slider body. A microactuator is attached to the slider body adjacent to the hinge. The microactuator is responsive to electrical control signals to selectively bend the hinge to alter the position of the transducing head with respect to the main portion of the slider body.

14 Claims, 7 Drawing Sheets

U.S. PATENT DOCUMENTS

| | | | |
|---|---|---|---|
| 5,276,573 | 1/1994 | Harada et al. | 360/103 |
| 5,282,190 | 1/1994 | Maruo et al. | 360/105 |
| 5,313,352 | 5/1994 | Chikazawa et al. | 360/103 |
| 5,423,207 | 6/1995 | Flechsig et al. | 73/104 |
| 5,517,472 | 5/1996 | Miyatake et al. | 369/13 |
| 5,570,336 | 10/1996 | Inui et al. | 369/126 |
| 5,657,188 | 8/1997 | Jurgenson et al. | 360/106 |
| 5,757,573 | 5/1998 | Tokuyama et al. | 360/75 |

OTHER PUBLICATIONS

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDd Using Multilayer Piezoelectric Load/Unload Mechanism" by Kajitani et al., *IEEE Transactions on Magnetics*, vol. 27, No. 6, Nov. 1991.

PIEZOELECTRIC ENGAGEABLE SLIDER AND SLIDER MICROACTUATOR

CROSS-REFERENCE TO RELATED APPLICATION(S)

This application is a continuation-in-part of U.S. application Ser. No. 08/846,809, filed Apr. 30, 1997, now abandoned for "Piezoelectric Engageable Slider" by P. Goglia and Z. Boutaghou, which in turn claims priority from Provisional Application Ser. No. 60/031,579, filed Dec. 5, 1996, now abandoned, for "PZT Bender" by P. Goglia and Z. Boutaghou.

This application claims priority from,Provisional Application Ser. No. 60/046,313, filed May 13, 1997, now abandoned, for "Simplified PZT Bender Concept" by Z. Boutaghou and P. Goglia, and also claims priority from Provisional Application Ser. No. 60/046,317, filed May 13, 1997 for "PZT Slider Body Micro-Actuator Concept" by Z. Boutaghou and P. Goglia.

BACKGROUND OF THE INVENTION

The present invention relates to a disc drive slider piezoelectric engagement and microactuating device that can be manufactured by mass production fabrication techniques.

In disc drive applications, it is desirable to implement a slider with the capability to selectively adjust the position of a transducer or optical head in relation to the disc medium. This capability is utilized to load and unload the head over the disc medium, to disengage the head from the disc medium while flying over the disc, and to dynamically adjust the fly height of the head while reading and/or writing data to and from the disc medium.

One solution for on-demand engagement and disengagement of a head involves machining a slot in the proximal end of the slider carrying the head, and fastening a piezoelectric stack in the slot such as by an adhesive. Activating the piezoelectric stack causes the slider to bend, thereby engaging the head carried on the slider in proximity with the disc media. However, this solution is not suitable for mass production, making it prohibitively expensive and time consuming to manufacture in any substantial quantity.

In addition to the need for a selective engagement device, there is also a need for a high resolution microactuator to precisely position the head over a selected radial track of the disc. More particularly, as efforts continue to increase track density, the radial spacing between concentric data tracks on the disc decreases. Conventional actuator motors, such as voice coil motors, lack sufficient resolution to effectively accommodate high track-density discs, necessitating the addition of a high resolution head microactuator.

Various microactuator designs have been considered to accomplish high resolution head positioning, including piezoelectric, electromagnetic, electrostatic, capacitive, fluidic, and thermal actuators. Various locations for the microactuator have been suggested, including on the slider itself and at the head mounting block connecting the head suspension load beam to the actuator arm, for example. However, previous microactuator designs have several shortcomings which limit their effectiveness. For example, many previous microactuator designs were directed to microactuators fabricated independently of the slider which had to be subsequently attached to the slider. Consequently, the microactuator could not be fabricated during the same thin film wafer processing for manufacturing the slider and transducing head, and additional tooling and assembly steps were required to attach the microactuator to the slider. As a result, the complexity of the manufacturing process increased and additional fabrication steps, separate from existing manufacturing techniques, were required, making these microactuator designs prohibitively expensive and inefficient to produce. Also, previous microactuator designs which located the microactuator distant from the slider, such as at the head mounting block, could achieve only limited frequency response in micropositioning the head, due to the relatively large mass being moved by the microactuator motor. Other microactuator designs suffered from these and various other limitations.

There is a need in the art for a device to provide selective engagement and disengagement of a transducing head in proximity with a disc media, and also for a device providing high resolution radial head positioning over selected data tracks of a disc. More particularly, there is a need for each of these devices in designs that can be fabricated onto the slider using existing wafer processing techniques, enabling easy and inexpensive mass production.

BRIEF SUMMARY OF THE INVENTION

The present invention is a slider assembly for selectively altering a position of a transducing head with respect to a rotatable disc. A slider body having opposing leading and trailing edge surfaces, opposing top and bottom surfaces, and opposing first and second side surfaces is arranged to be supported by a support structure over a surface of the disc. A slot is machined in the slider body proximate the trailing edge surface, forming a hinge joining a distal portion of the slider body adjacent the trailing edge surface to a main portion of the slider body. The transducing head is carried by the distal portion of the slider body. A microactuator is attached to the slider body adjacent to the hinge. The microactuator is responsive to electrical control signals to selectively bend the hinge to alter the position of the transducing head with respect to the main portion of the slider body. The hinge may be parallel to the top surface or the first side surface of the slider body, so that selective bending of the hinge alters either a distance between the transducing head and the surface of the rotatable disc or a radial position of the transducing head with respect to the disc.

One aspect of the present invention is a method of forming a slider body operable to selectively position a transducing head relative to a rotatable disc. A transducing head is formed in the slider body adjacent the trailing edge surface of the slider body. A slot is machined in the slider body to form a hinge joining a distal portion of the slider body carrying the transducing head adjacent the trailing edge surface to a main portion of the slider body. A microactuator is attached to the slider body adjacent the hinge, so that bending of the hinge alters the position of the transducing head with respect to the main portion of the slider body.

A further aspect of the present invention is a method selectively altering a position of a transducing head supported by a slider body with respect to a rotatable disc. The slider body is supported over a surface of the rotatable disc. The slider body has opposing leading and trailing edge surfaces, opposing top and bottom surfaces and opposing first and second side surfaces. The slider body also has a slot proximate to the trailing edge surface of the slider body, forming a hinge joining a distal portion of the slider body adjacent the trailing edge surface carrying the transducing head to a main portion of the slider body. The slider body further includes a microactuator attached adjacent the hinge, the microactuator being responsive to electrical control signals to selectively bend the hinge to alter the position of the transducing head with respect to the main portion of the slider body. The microactuator is operated to selectively bend the hinge and thereby alter the position of the transducing head with respect to the rotatable disc.

DETAILED DESCRIPTION OF THE PREFERRED EMBODIMENTS

Figure 1:
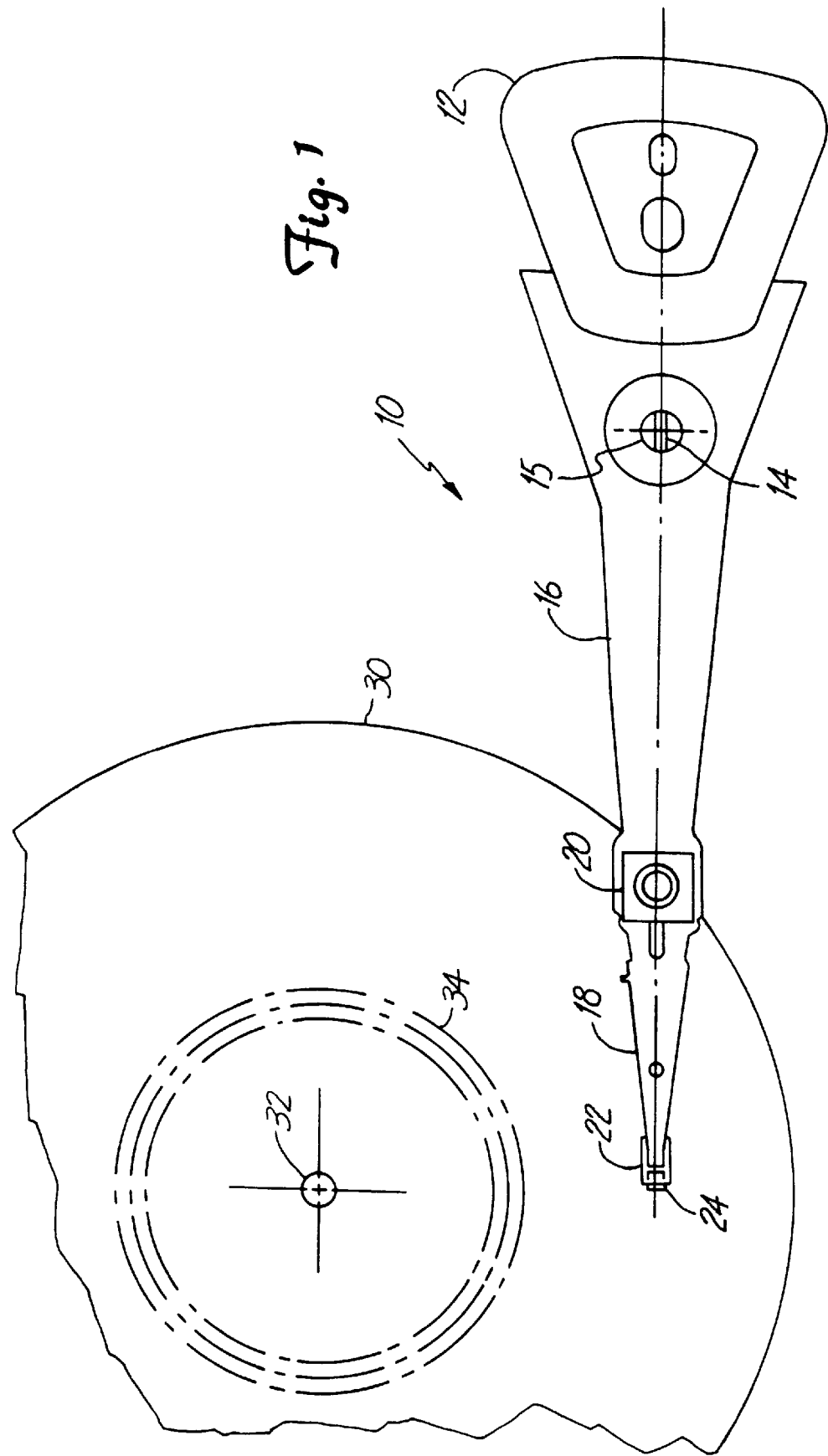
FIG. 1 is a top view of a disc drive system for supporting a slider over the surface of a disc.

FIG. 1 is a top view of a disc drive actuation system 10 for positioning slider 24 over a track 34 of disc 30. Actuation system 10 includes voice coil motor (VCM) 12 arranged to rotate actuator arm 16 around axis 14 on support spindle 15. Head suspension 18 is connected to actuator arm 16 at head mounting block 20. Flexure 20 is connected to an end of head suspension 18, and carries slider 24. Slider 24 carries the transducing head (not shown in FIG. 1) for reading and/or writing data on concentric tracks 34 of disc 30. Disc 30 rotates around axis 32, so that windage is encountered by slider 24 to keep it aloft a small distance above the surface of disc 30. VCM 12 is selectively operated to move actuator arm 16 around axis 14, thereby moving slider 24 between tracks 34 of disc 30.

Figure 2:
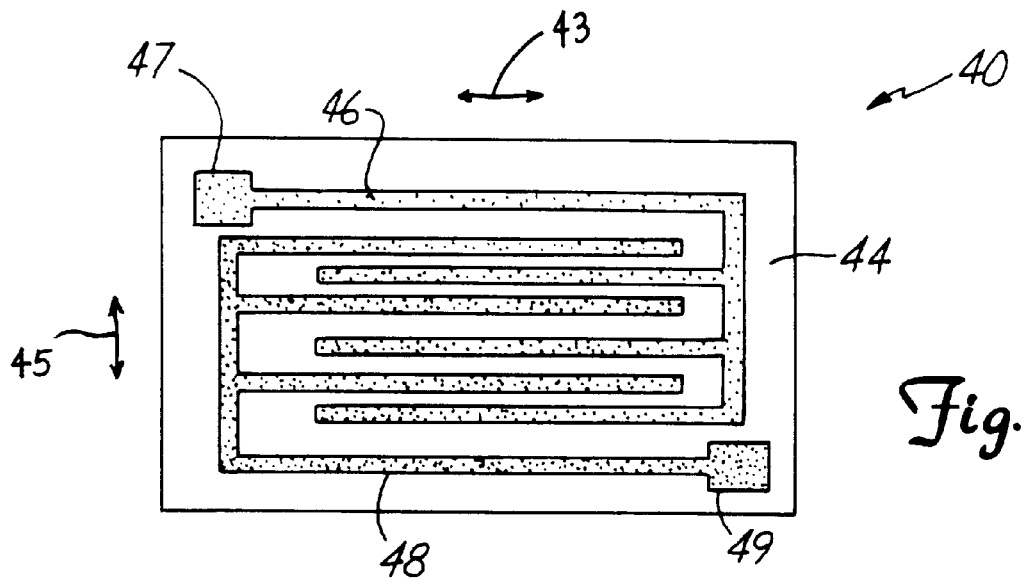
FIG. 2 is a top view of a piezoelectric bending apparatus for use with the present invention.

FIG. 2 is a top view of a piezoelectric bending apparatus 40 for use with the present invention, comprising a piezoelectric element 44 having conductors 46 and 48 patterned on its top surface, forming aligned longitudinal legs. As used herein, "longitudinal" refers to the direction of the longest length of piezoelectric element 44, and "lateral" refers to the direction perpendicular to the longest length on the top surface of piezoelectric element 44. Bond pad 47 is connected to conductor 46, and bond pad 49 is connected to conductor 48, to allow easy access to conductors 46 and 48 by separate external leads, for example. Voltages are applied to conductors 46 and 48 through bond pads 47 and 49.

Figure 3:
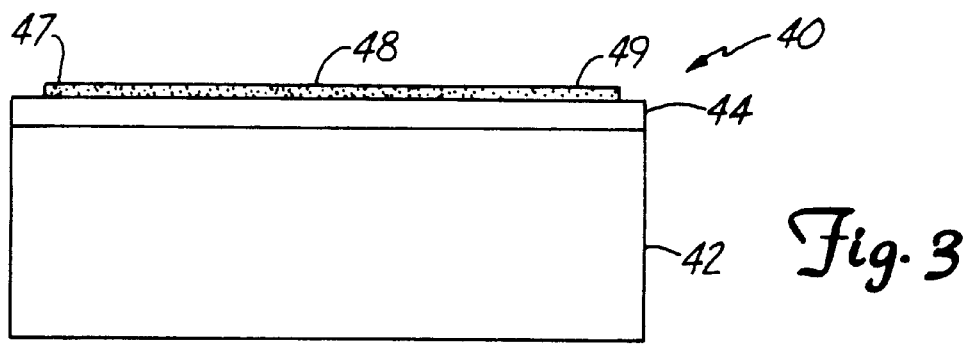
FIG. 3 is a side view of the piezoelectric bending apparatus of FIG. 2 in its neutral position.
Figure 4:
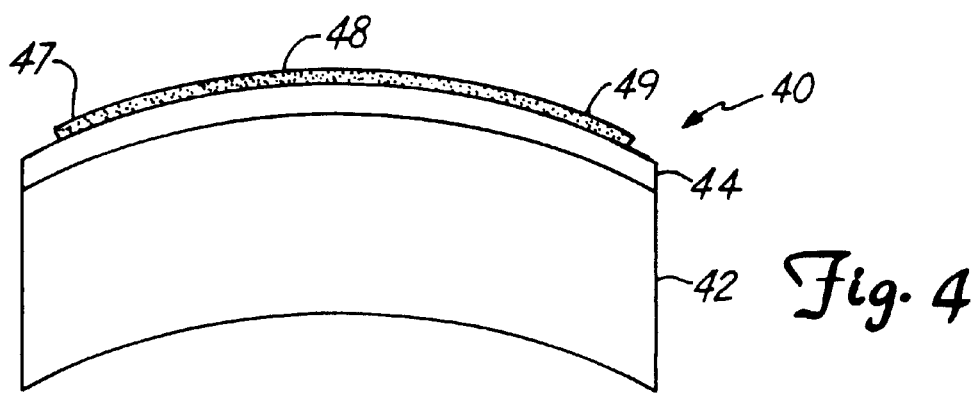
FIG. 4 is a side view of the piezoelectric bending apparatus of FIG. 2 in an actuated position.

FIGS. 3 and 4 are side views of the piezoelectric bending apparatus of FIG. 2. Piezoelectric element 44 is disposed on support 42, and has conductors 46 and 48 patterned on its top surface. When there is no voltage difference between conductors 46 and 48, piezoelectric bending apparatus 40 is in its neutral position, as shown in FIG. 3. A voltage difference applied to bond pads 49 and 47 creates a potential difference between conductors 48 and 46. Where, as in FIG. 2, conductors 48 and 46 are interleaved and aligned with legs extending longitudinally (with the longitudinal direction being the direction of greatest length 43 on the top surface of piezoelectric element 44), the electric field produced by the voltage difference between conductors 48 and 46 is substantially longitudinal, resulting in longitudinal stretching and lateral contraction (with the lateral direction 45 being the direction on the top surface of piezoelectric element 44 perpendicular to the longitudinal direction 43) of piezoelectric element 44. As a result, piezoelectric bending apparatus 40 bends to an actuated shape, as shown (exaggerated) in FIG. 4. A voltage difference of opposite polarity between conductors 46 and 48 would produce a substantially lateral electric field, resulting in lateral stretching and longitudinal contraction of piezoelectric element 44, thereby causing piezoelectric bending apparatus 40 to bend in the opposite direction.

Figure 5:
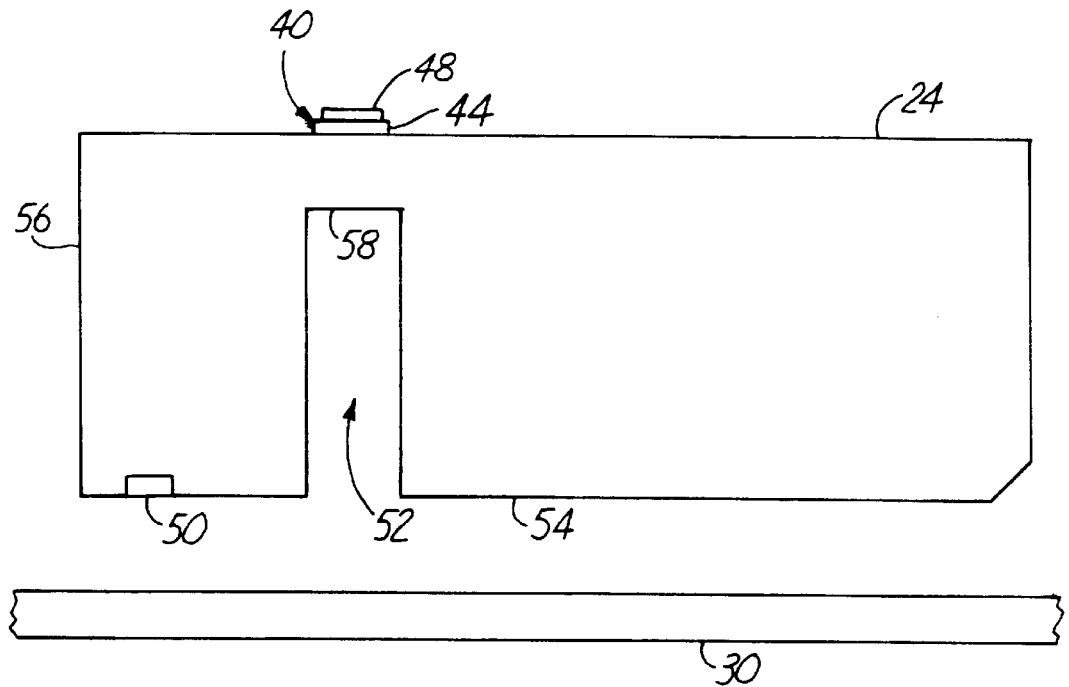
FIG. 5 is a side view of a slider utilizing a piezoelectric bending apparatus according to the present invention, in its neutral position.

FIG. 5 is a side view of slider 24 flying over the surface of disc 30, utilizing a piezoelectric bending apparatus to selectively engage and disengage transducing head 50 in proximity to the surface of disc 30. Slider 24 has an air-bearing surface 54, trailing edge surface 56, and slot 52 formed by micro-machining, for example, to form hinge 58 to permit movement of the portion of slider 24 adjacent trailing edge surface 56 with respect to the remainder of slider 24. Piezoelectric bending apparatus 40 is disposed on hinge 58 adjacent slot 52. Piezoelectric element 44 is disposed directly on the top surface of slider 24, with conductors 46 and 48 patterned on the top surface of piezoelectric element 44 as shown in FIGS. 2–4.

Figure 6:
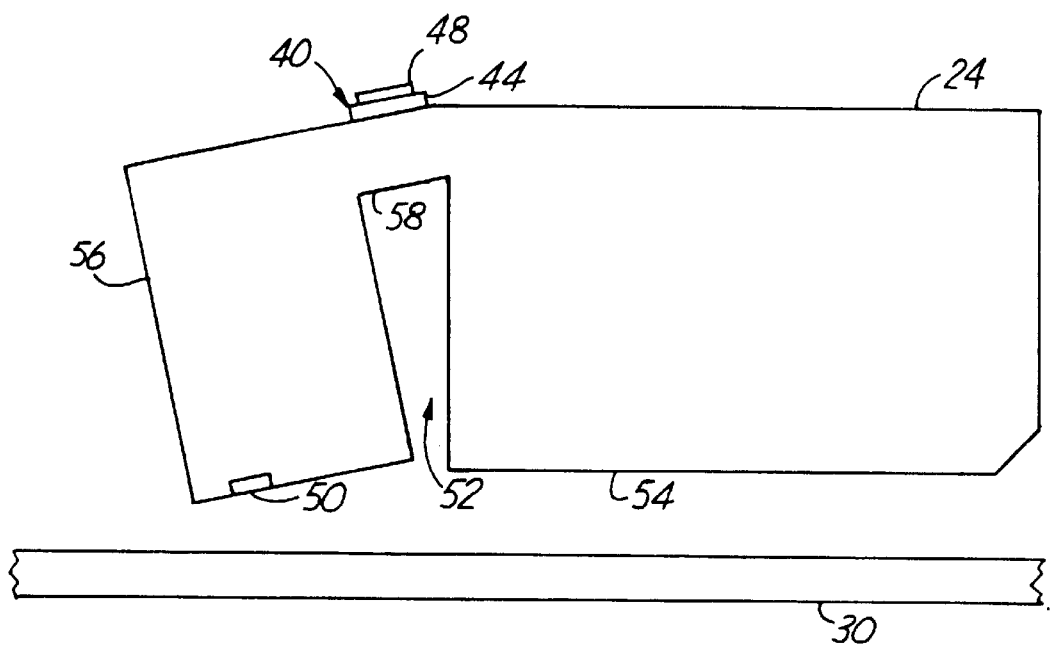
FIG. 6 is a side view of the slider shown in FIG. 5, in an actuated position.

In operation, a voltage difference is applied between conductors 46 and 48 of piezoelectric bending apparatus 40, to cause distortion of the bending apparatus, which forces hinge 58 of slider 24 to bend as well. As a result, the portion of slider 24 adjacent to trailing edge surface 56 moves to a position represented in FIG. 6, engaging transducing head 50 in closer proximity to the surface of disc 30. Minor adjustments in the fly height of head 50 over disc 30 may be made by regulating the voltage difference between conductors 46 and 48 and thereby slightly changing the bending of piezoelectric element 44 and hinge 58. Applying an opposite voltage difference between conductors 46 and 48 will cause bending in the opposite direction, disengaging transducing head 50 from proximity with the surface of disc 30.

Figure 7:
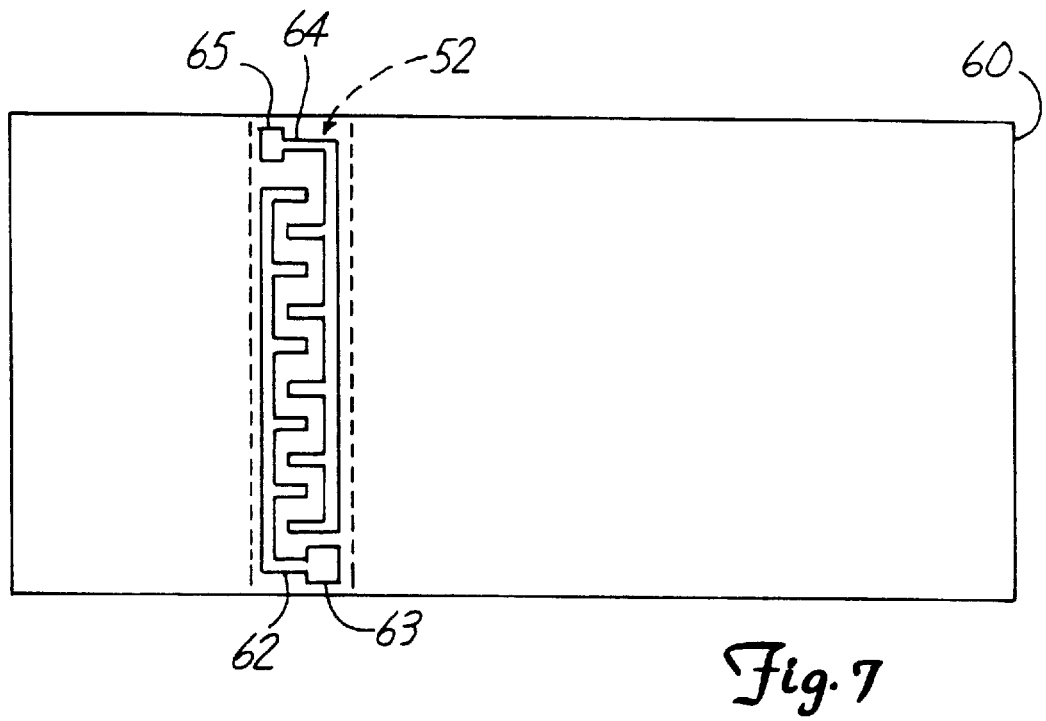
FIG. 7 is a top view of a piezoelectric slider utilizing patterned conductors on its top surface according to a second embodiment of the invention.

FIG. 7 is a top view of a slider 60, composed of a piezoelectric material, having conductors 62 and 64 patterned on its top surface adjacent to slot 52. Bond pad 63 connects to conductor 62, and bond pad 65 connects to conductor 64 to enable connection to separate external leads for applying voltages to conductors 62 and 64.

Figure 8:
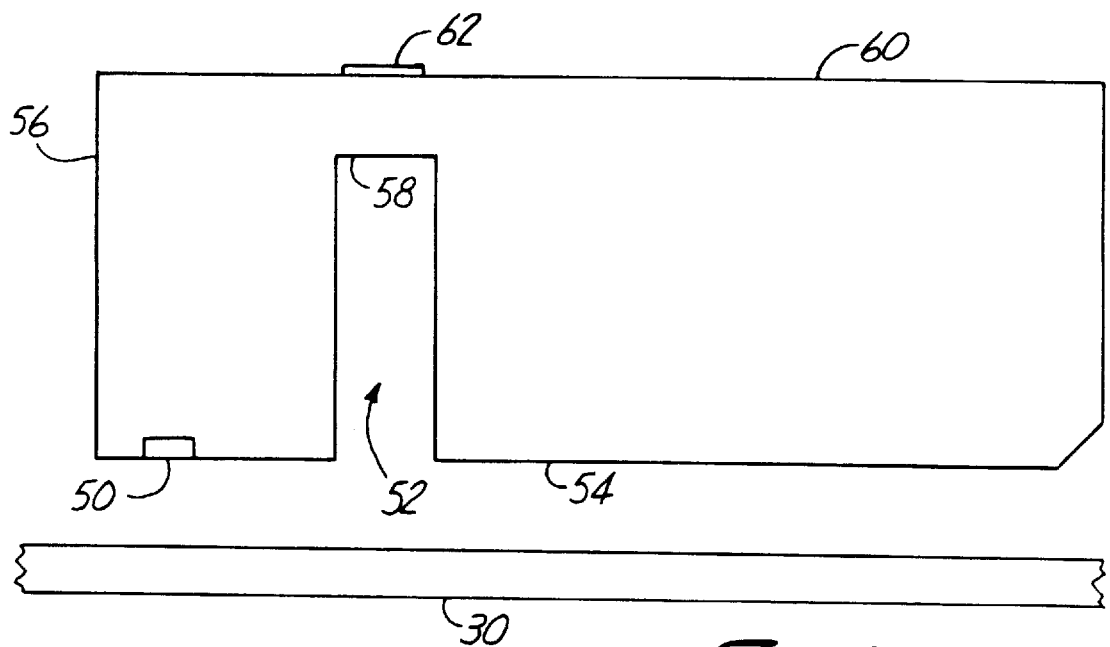
FIG. 8 is a side view of the piezoelectric slider shown in FIG. 7, in its neutral position.
Figure 9:
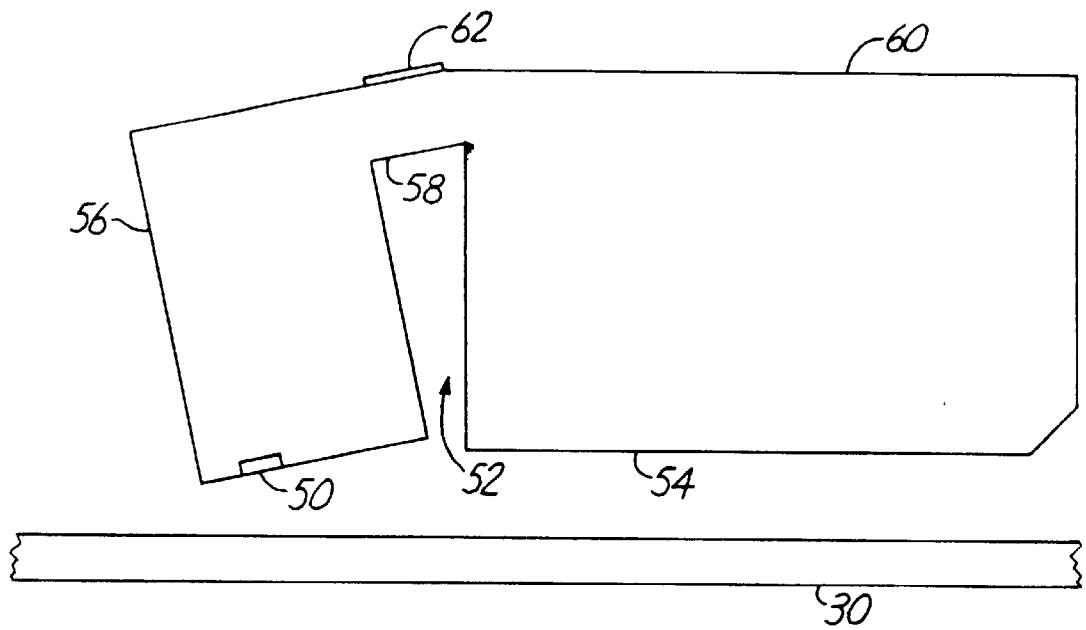
FIG. 9 is a side view of the piezoelectric slider shown in FIG. 7, in an actuated position.

FIG. 8 is a side view of piezoelectric slider 60 shown in FIG. 7, in its neutral position. In operation, a voltage difference is applied between conductors 62 and 64 to cause bending of hinge 58 of piezoelectric slider 60. As a result, the portion of slider 60 adjacent to trailing edge surface 56 moves to a position represented in FIG. 9, engaging transducing head 50 in closer proximity to the surface of disc 30. Applying voltages of opposite polarity to conductors 62 and 64 will cause bending in the opposite direction, disengaging transducer 50 from proximity to disc 30. Adjustments may be made to the fly height of head 50 by regulating the voltage difference between conductors 62 and 64 and thereby causing small amounts of bending of hinge 58 to finely adjust the distance between transducing head 50 and disc 30.

Figure 10:
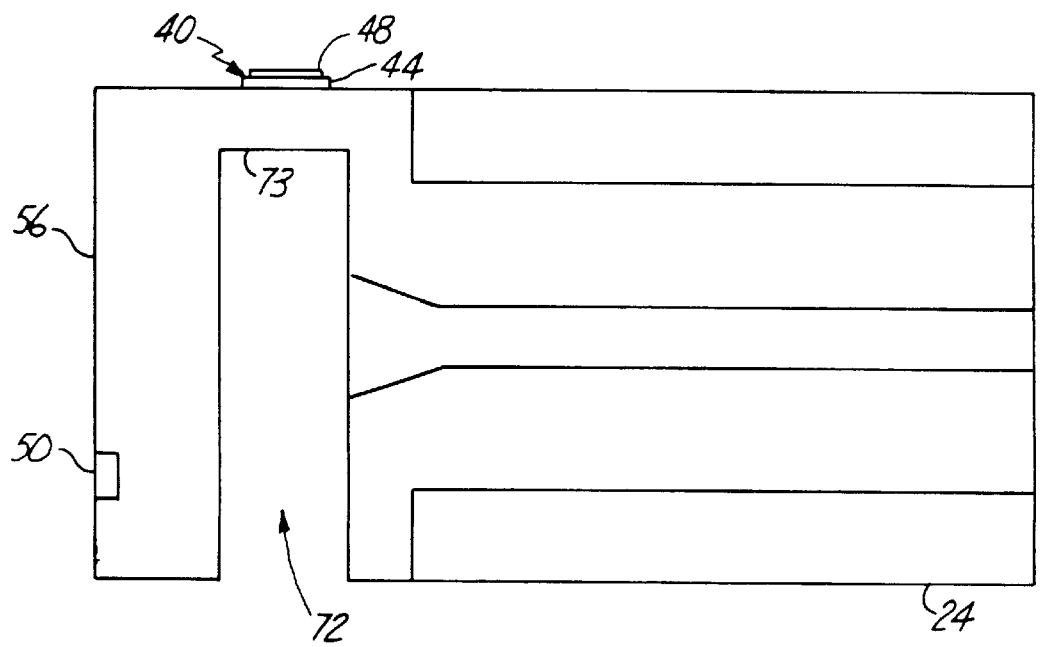
FIG. 10 is a bottom view of a slider utilizing a piezoelectric bending apparatus for radial micropositioning of a head over a selected track of a disc according to a third embodiment of the invention, in its neutral position.
Figure 11:
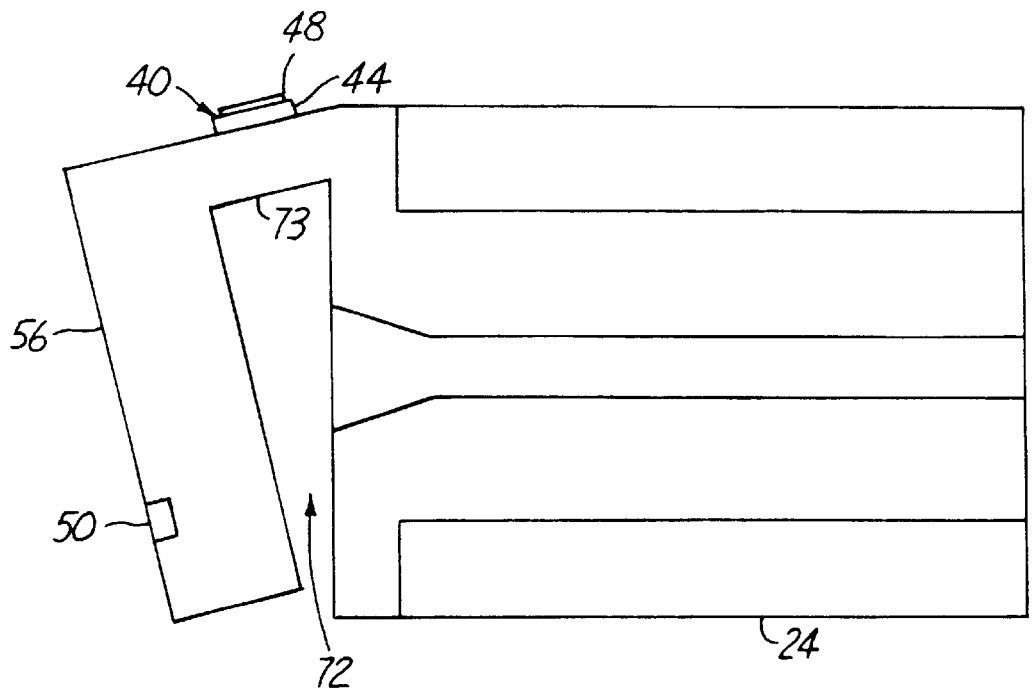
FIG. 11 is a bottom view of the slider of FIG. 10, in an actuated position.

FIGS. 10 and 11 are bottom views of a slider 24 utilizing piezoelectric bending apparatus 40 to selectively alter the radial position of transducing head 50 with respect to concentric tracks of a rotatable disc 30 (FIG. 1). Slider 24 has trailing edge surface 56, and slot 72 formed by micromachining, for example, to form hinge 73 to permit movement of the portion of slider 24 adjacent trailing edge surface 56 with respect to the remainder of slider 24. Piezoelectric bending apparatus 40 is disposed on hinge 73 adjacent to slot 72 machined in slider 24. Piezoelectric element 44 is disposed directly on the side surface of slider 24, with conductors 46 and 48 patterned on the top surface of piezoelectric element 44 as shown in FIGS. 2–4.

In operation, a voltage difference is applied between conductors 46 and 48 of piezoelectric bending apparatus 40 to cause distortion of the bending apparatus, which forces hinge 73 of slider 24 to bend as well. As a result, the portion of slider 24 adjacent to trailing edge surface 56 moves to a position represented in FIG. 11, moving transducing head 50 between radial tracks of the rotatable disc. Minor adjustments in the radial position of head 50 over the disc may be made by regulating the voltage difference between conductors 46 and 48 and thereby slightly changing the bending of piezoelectric element 44 and hinge 73. Applying an opposite voltage difference between conductors 46 and 48 will cause bending in the opposite direction, displacing head 50 in the opposite radial direction relative to the tracks on the disc.

Figure 12:
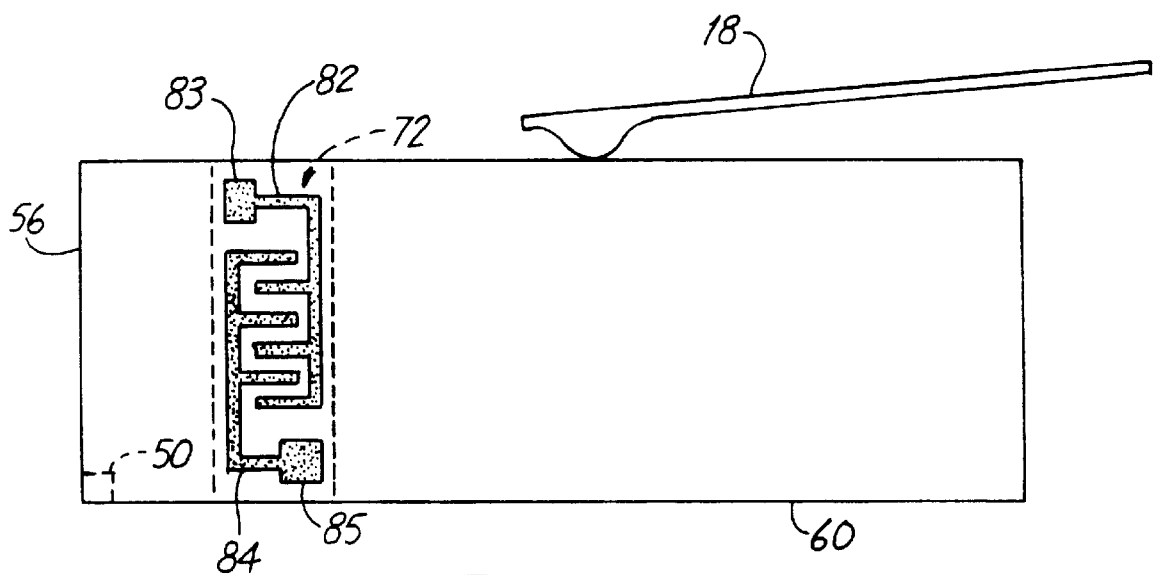
FIG. 12 is a side view of a piezoelectric slider utilizing patterned conductors to radially microposition a transducing head over a selected track of a disc according to a fourth embodiment of the invention.

FIG. 12 is a side view of slider 60, composed of a piezoelectric material, having conductors 82 and 84 patterned on its side surface adjacent to slot 72. Bond pad 83 connects to conductor 82, and bond pad 85 connects to conductor 84 to enable connection to separate external leads for applying voltages to conductors 82 and 84.

Figure 13:
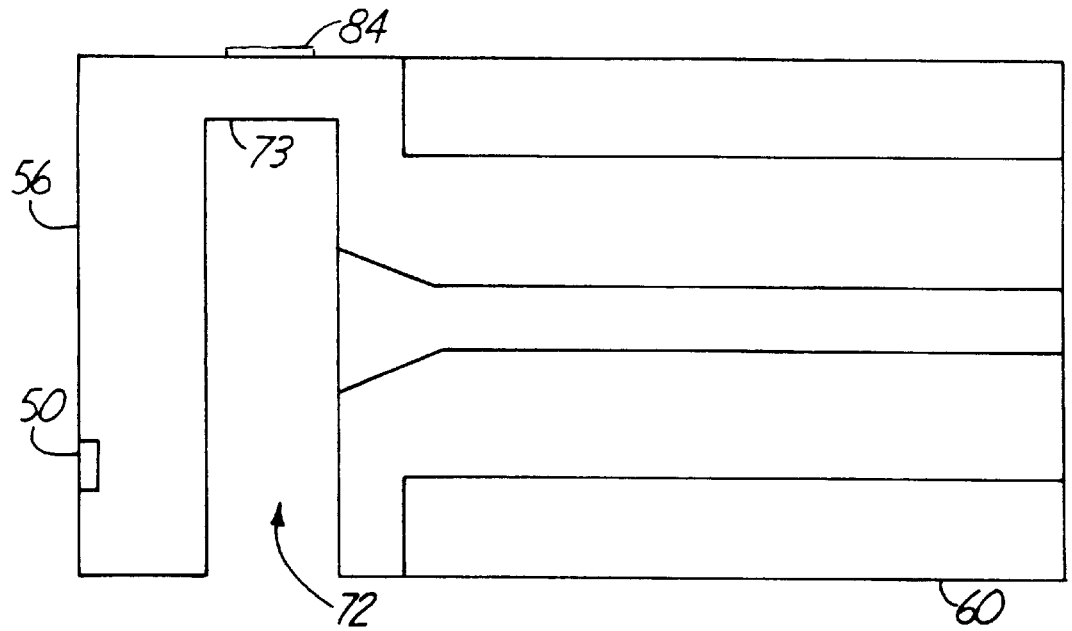
FIG. 13 is a bottom view of the piezoelectric slider shown in FIG. 12, in its neutral position.
Figure 14:
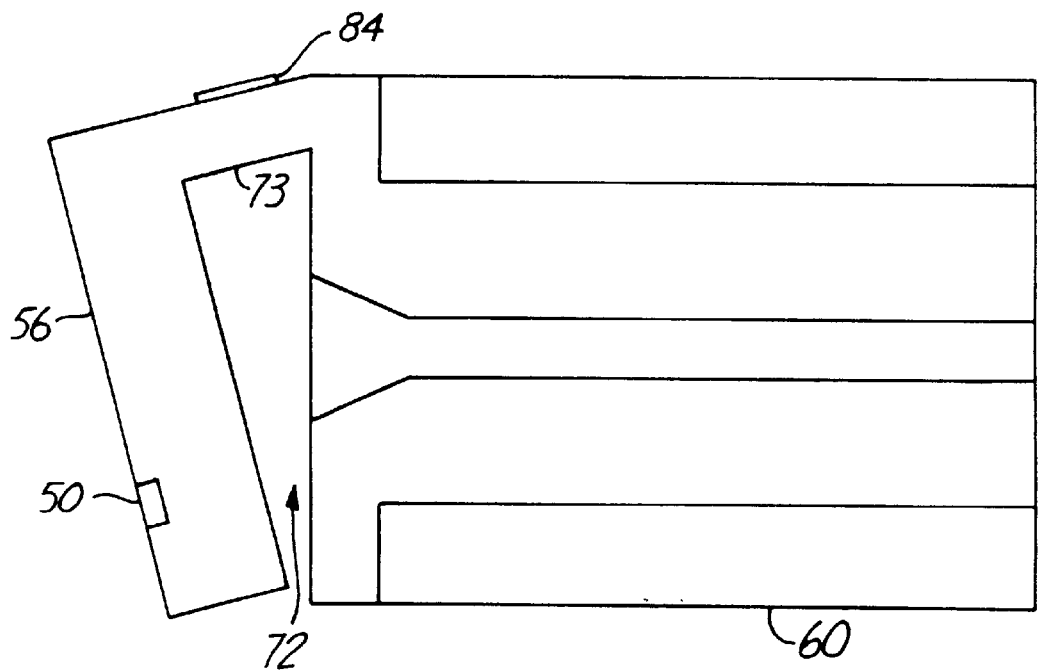
FIG. 14 is a bottom view of the piezoelectric slider shown in FIG. 12, in an actuated position.

FIG. 13 is a bottom view of the piezoelectric slider 60 shown in FIG. 12, in its neutral position. In operation, a voltage difference is applied between conductors 82 and 84 to cause bending of hinge 73 of piezoelectric slider 60. As a result, the portion of slider 60 adjacent to trailing edge surface 56 moves to a position represented in FIG. 14, altering the radial position of transducing head 50 with respect to tracks on the surface of the rotatable disc. Applying voltages of opposite polarity to conductors 82 and 84 will cause bending in the opposite direction, moving transducer 50 in the opposite radial direction with respect to the tracks on the disc. Adjustments may be made to the radial position of head 50 by regulating the voltage difference between conductors 82 and 84 and thereby causing small amounts of bending of hinge 73 to finely adjust the radial position of transducing head 50.

The present invention provides a mechanism to selectively engage and disengage a transducing head in proximity with a disc media, and also for providing high resolution radial head positioning over selected tracks of a disc. The mechanism may be a separate piezoelectric bending apparatus for attachment to a slider, or may be integrated into the design of the slider itself. A slot is micro-machined into the slider to enable bending of the portion of the slider carrying the transducing head, to enable either vertical or radial positioning thereof, depending on the design implemented. The mechanisms of the invention achieve high performance and frequency standards, and are fabricated using existing wafer processing techniques in slider manufacture, enabling easy and inexpensive mass production.

Although the present invention has been described with reference to preferred embodiments, workers skilled in the art will recognize that changes may be made in form and detail without departing from the spirit and scope of the invention.

We claim:

1. A slider assembly for selectively altering a position of a transducing head with respect to a rotatable disc, comprising:

a slider body having a slot forming a hinge joining a distal portion of the slider body to a main portion of the slider body and being arranged to be supported by a support structure over a surface of the rotatable disc, the distal portion of the slider body carrying the transducing head; and means for altering the position of the distal portion of the slider body with respect to the main portion of the slider body to adjust the position of the transducing head with respect to the rotatable disc.

2. A slider assembly for selectively altering a position of a transducing head with respect to a rotatable disc, comprising:

a slider body having opposing leading and trailing edge surfaces, opposing top and bottom surfaces, and opposing first and second side surfaces, the slider body being arranged to be supported by a support structure over a surface of the rotatable disc;

a slot in the slider body proximate the trailing edge surface of the slider body, the slot forming a hinge joining a distal portion of the slider body adjacent the trailing edge surface to a main portion of the slider body, the transducing head being carried by the distal portion of the slider body; and a microactuator attached to the slider body adjacent to the hinge, the microactuator being responsive to electrical control signals to selectively bend the hinge to alter the position of the transducing head with respect to the main portion of the slider body.

3. The slider assembly of claim 2, wherein the hinge in the slider body is parallel to the top surface of the slider body and the microactuator is attached to the top surface of the slider body, so that selectively bending the hinge alters a distance between the transducing head and a surface of the rotatable disc.

4. The slider assembly of claim 2, wherein the hinge in the slider body is parallel to the first side surface of the slider body and the microactuator is attached to the first side surface of the slider body, so that selectively bending the hinge alters a radial position of the transducing head with respect to the rotatable disc.

5. The slider assembly of claim 2, wherein the microactuator comprises:

a piezoelectric element having top and bottom surfaces, the bottom surface being attached to the slider body adjacent to the hinge;

first and second confronting conductors patterned on the top surface of the piezoelectric element so that a voltage between the first and second conductors induces an electric field in the piezoelectric element to cause bending of the hinge.

6. The slider assembly of claim 2, wherein the slider body is composed of a piezoelectric material and the microactuator includes first and second confronting conductors patterned on the slider body adjacent the hinge so that a voltage between the first and second conductors induces an electric field in the hinge to cause it to bend.

7. The slider assembly of claim 2, wherein the hinge, the distal portion and the main portion of the slider body are an integral structure.

8. A method of forming a slider body operable to selectively position a transducing head relative to a rotatable disc, the method comprising:

forming a transducing head in the slider body adjacent a trailing edge surface of the slider body;

machining a slot in the slider body to form a hinge joining a distal portion of the slider body carrying the transducing head adjacent the trailing edge surface to a main portion of the slider body;

attaching a microactuator to the slider body adjacent the hinge, so that bending of the hinge alters the position of the transducing head with respect to the main portion of the slider body.

9. The method of claim 8, wherein the step of machining the slot in the slider body forms the hinge parallel to a top surface of the slider body, so that selective bending of the hinge alters a distance between the transducing head and a surface of the rotatable disc.

10. The method of claim 8, wherein the step of machining the slot in the slider body forms the hinge parallel to a side surface of the slider body, so that selective bending of the hinge alters a radial position of the transducing head with respect to the rotatable disc.

11. The method of claim 8, wherein the step of attaching the microactuator comprises patterning first and second confronting conductors on a piezoelectric element so that a voltage between the first and second conductors induces an electric field in the piezoelectric element to cause bending.

12. The method of claim 8, wherein the slider body is composed of a piezoelectric material and the step of attaching the microactuator comprises patterning first and second confronting conductors on the hinge so that a voltage between the first and second conductors induces an electric field in the hinge to cause it to bend.

13. A method of selectively altering a position of a transducing head carried by a slider body with respect to a rotatable disc, the method comprising:

supporting the slider body over a surface of the rotatable disc, the slider body having:
opposing leading and trailing edge surfaces, opposing top and bottom surfaces, and opposing first and second side surfaces;
a slot proximate to the trailing edge surface of the slider body, the slot forming a hinge joining a distal portion of the slider body adjacent the trailing edge surface carrying the transducing head to a main portion of the slider body; and
a microactuator attached to the slider body adjacent the hinge, the microactuator being responsive to electrical control signals to selectively bend the hinge to alter the position of the transducing head with respect to the main portion of the slider body; and
operating the microactuator to selectively bend the hinge and thereby alter the position of the transducing head with respect to the rotatable disc.

14. A device for selectively engaging a transducing head in proximity with a rotatable disc media, the device comprising:

a slider body having an air-bearing surface, a top surface, a leading surface, a trailing surface, and a slot extending substantially parallel to the trailing surface to define a main portion of the slider body and a distal portion of the slider body carrying the transducing head, with a beam normal to the air-bearing surface hinging the distal portion of the slider body to the main portion of the slider body; and a piezoelectric microactuator on the slider body operable to selectively bend the beam to adjust a height of the transducing head with respect to the air-bearing surface in response to voltages applied to the piezoelectric microactuator.

\* \* \* \* \*